Sept. 27, 1960    A. G. BUTLER ET AL    2,954,136
PIPE-HANDLING VEHICLE

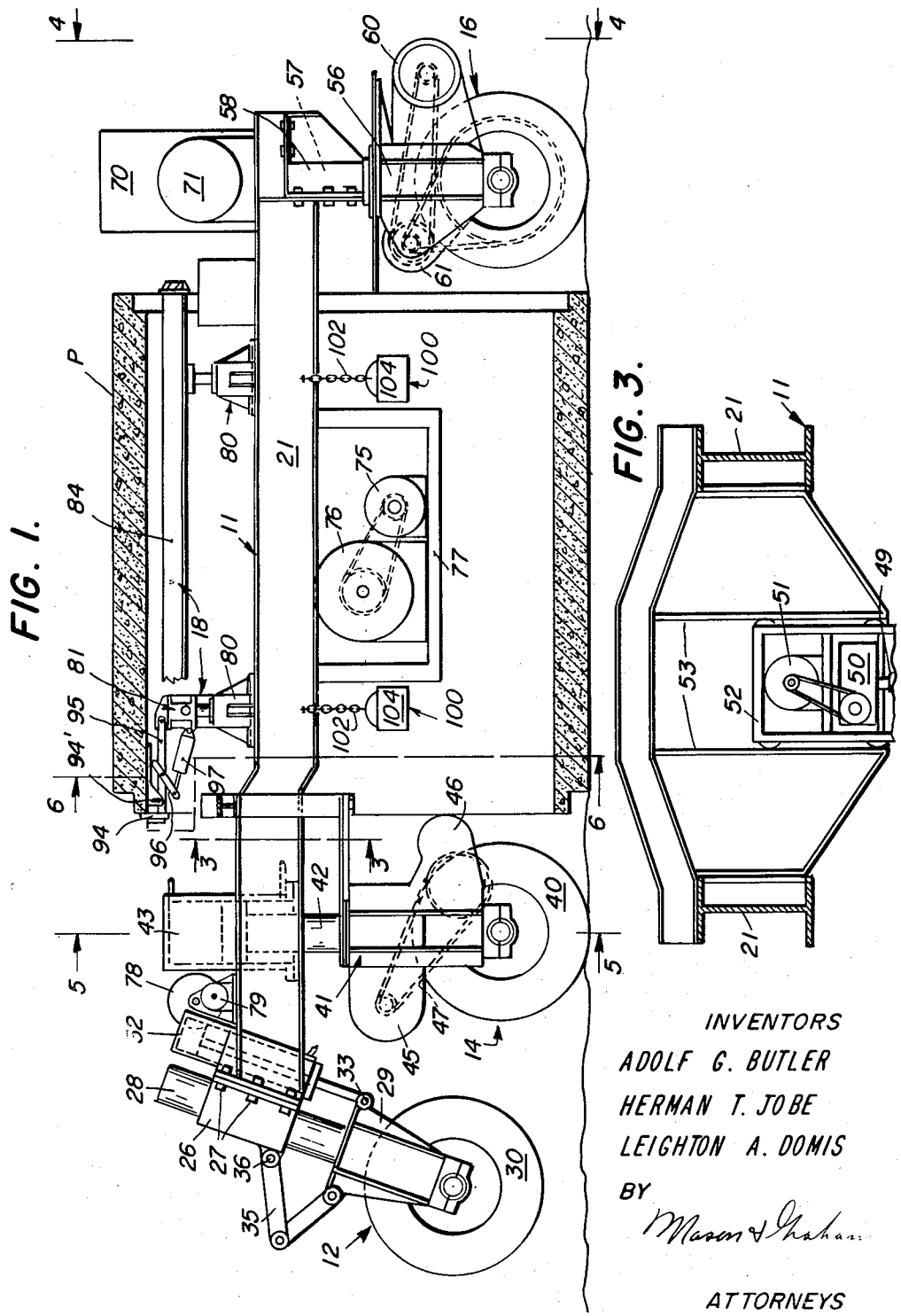
Sept. 27, 1960     A. G. BUTLER ET AL     2,954,136
PIPE-HANDLING VEHICLE
Filed May 21, 1957     4 Sheets-Sheet 1
INVENTORS
ADOLF G. BUTLER
HERMAN T. JOBE
LEIGHTON A. DOMIS
BY
Mason & Graham
ATTORNEYS

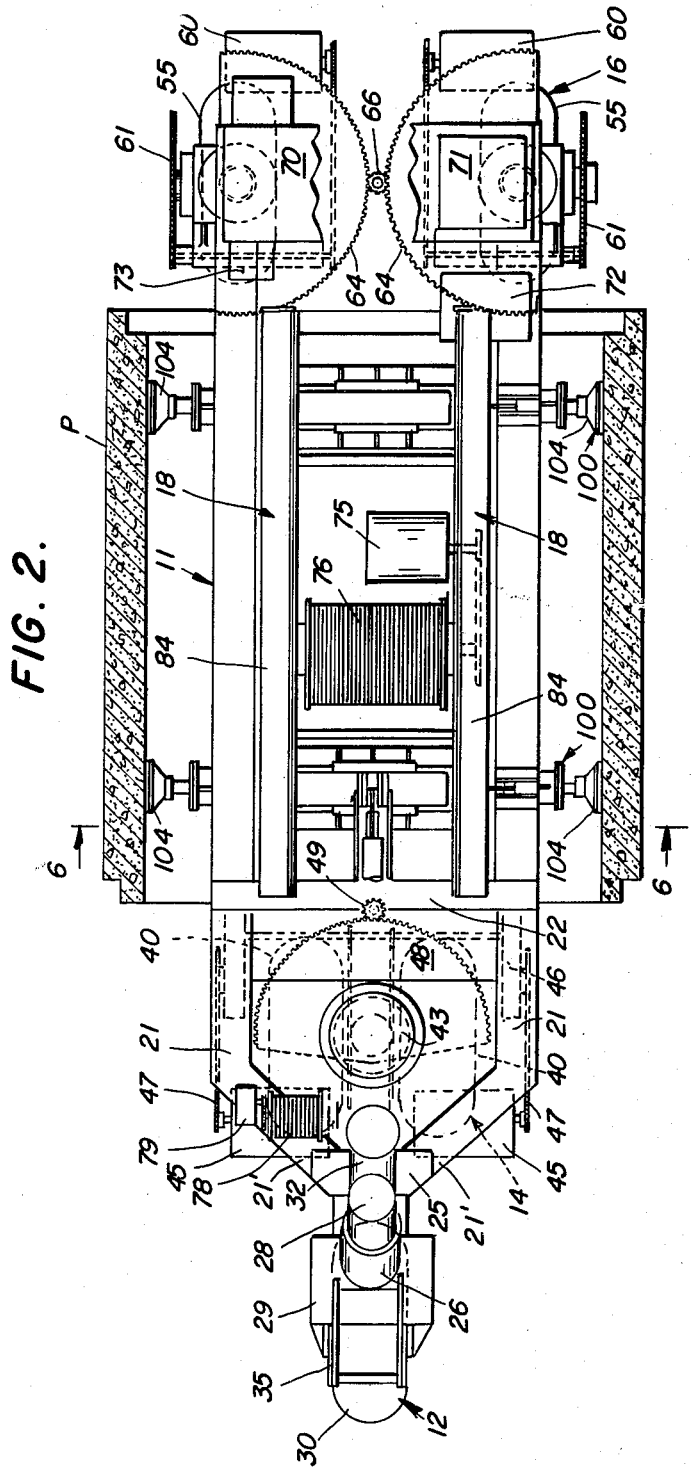

Filed May 21, 1957    4 Sheets-Sheet 3

INVENTORS
ADOLF G. BUTLER
HERMAN T. JOBE
LEIGHTON A. DOMIS
BY

ATTORNEYS

Sept. 27, 1960　　A. G. BUTLER ET AL　　2,954,136
PIPE-HANDLING VEHICLE

Filed May 21, 1957　　4 Sheets-Sheet 4

INVENTORS
ADOLF G. BUTLER
HERMAN T. JOBE
LEIGHTON A. DOMIS
BY
Mason & Graham
ATTORNEYS

United States Patent Office 2,954,136
Patented Sept. 27, 1960

2,954,136
PIPE-HANDLING VEHICLE

Adolf G. Butler and Herman T. Jobe, Downey, and Leighton A. Domis, Manhattan Beach, Calif., assignors to American Pipe and Construction Co., a corporation of Delaware Filed May 21, 1957, Ser. No. 660,535

7 Claims. (Cl. 214—394)

This invention has to do with means for lifting, transporting, and laying heavy sections of concrete pipe and more particularly with a self-propelled vehicle capable of handling extremely heavy pipe sections.

A difficulty heretofore experienced in the laying of heavy concrete pipe sections in trenches has been that heavy hoisting equipment capable of lifting the pipe, which may weigh as much as 65 tons per section, cannot be brought close enough to the sides of the trench in which the pipe is to be laid without causing a cave-in of the trench sides with consequent damage to both the trench and equipment. Therefore, it is an object of our invention to provide a novel, self-propelled vehicle capable of lifting, transporting, and laying pipe which can be run in the pipe trench as well as on the ground above the trench.

More particularly it is an object to provide a pipe-handling vehicle designed to be run into a section of pipe resting on the ground into a position such that the vehicle extends from the ends of the pipe section and then can be used to elevate the same, transport it to the desired place, and lower it into proper position.

A further object is to provide a pipe-handling vehicle, adapted to transport pipe with the pipe suspended about the midportion of the vehicle in encircling relation thereto, having two sets of ground-engaging wheel means at at least one end of the vehicle which are independently vertically adjustable to facilitate the movement of the vehicle into, through, and partially out of the pipe section to be handled.

A further object is to provide a self-propelled pipe-handling vehicle of the type indicated which includes novel means for supporting a pipe section for transit.

These and other objects will be apparent from the drawing and the following description. Referring to the drawings:

Fig. 1 is a side elevational view, partly in section, of a vehicle embodying the invention, together with a pipe section in position to be lifted to carrying position;

Fig. 2 is a plan view of the device of Fig. 1;

Fig. 3 is a fragmentary sectional view on line 3—3 of Fig. 1;

Figure 4:
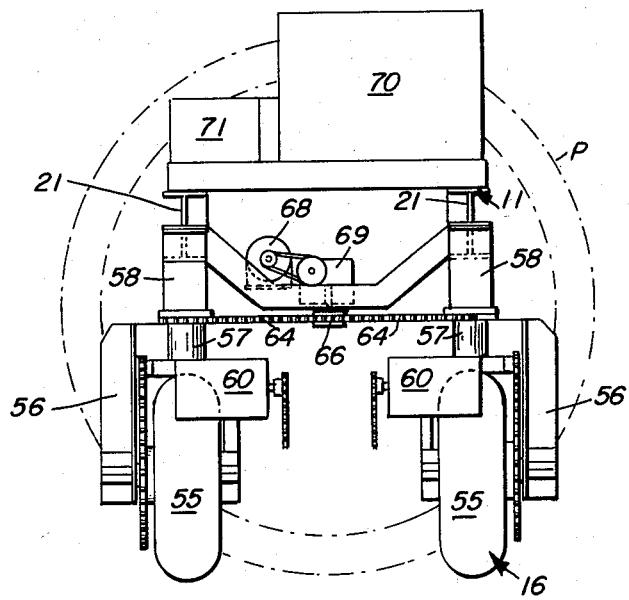
Fig. 4 is an elevational view in the plane of line 4—4 of Fig. 1.
Figure 5:
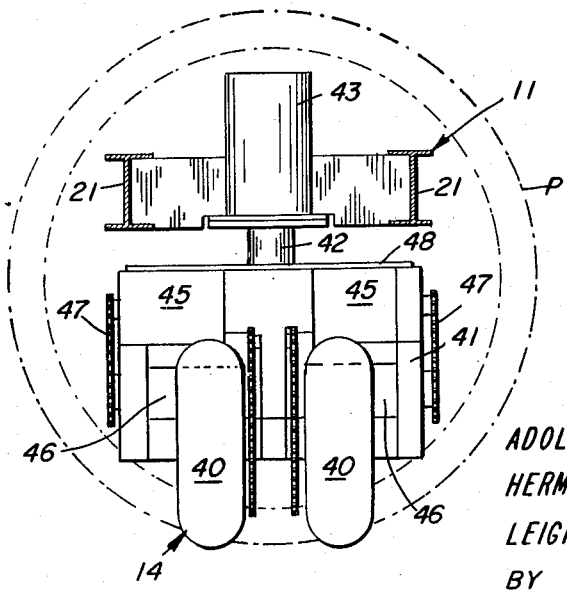
Fig. 5 is a sectional view on line 5—5 of Fig. 1.

More particularly describing the invention, the vehicle in general includes a frame 11 which is supported upon three sets of ground-engaging wheel means, these being designated generally by the numerals 12, 14, and 16. Intermediate the ends of the frame and between the ground-engaging wheel means 14 and 16 is a means for supporting a pipe section, the means being generally designated by numeral 18 and the pipe section by letter P. In Fig. 1 of the drawing the machine or vehicle is shown extending through the pipe section which, in this particular view, is shown resting upon the ground. The pipe-supporting means 18 is vertically movable to elevate the pipe section so that it can be transported.

In order to facilitate entrance of the forward end of the vehicle into and the passage of the same through a pipe section until the machine is located with respect thereto, as shown in Fig. 1, the ground-engaging wheel means 12 and 14 are independently vertically adjustable, and the means 12, or nose wheel means, has been shown in raised position. Thus, as the vehicle first approaches the pipe section, the wheel means 12 would be raised so that it can enter the pipe section without in any way damaging the end thereof. The vehicle is then advanced until the wheel means 14 approaches the edge of the pipe. Thereupon the nose wheel means is lowered to carry the weight of the front end of the vehicle and the wheel means 14 is retracted to bring it up to the proper level to run inside the pipe section. The vehicle is then advanced until the nose wheel projects beyond the end of the pipe whereupon it is lowered to the ground and the vehicle again advanced to the position in which it is shown in Fig. 1 of the drawing, the wheel means 14 being lowered after it has cleared the end of the pipe.

Referring now in more detail to the structure, it should be noted that the drawing is to some extent diagrammatic in character, since it appears unnecessary to a full disclosure of the invention to show in detail constructions which will be readily apparent to one skilled in the art. The frame 11 is shown as comprising the two side rails 21 which are connected by various cross members as will appear including a cross member 22. The members 21 converge at their forward end, having converging sections 21', and are joined by a plate 25, a cylinder section 26 and suitable bolts 27. Section 26 slidably and rotatably receives the stem 28 of a bifurcated wheel support 29 mounting the nose wheel 30 of wheel means 12. A ram or fluid-operated piston-cylinder means, generally indicated by 32, is mounted on the frame and detachably connected at 33 to member 29 for the purpose of retracting and extending or elevating and lowering the nose wheel. A linkage 35 normally tends to keep the nose wheel oriented for direct forward travel; however, we preferably provide a removable pin 36 so that this linkage may be disconnected to permit rotation of the nose wheel by hand.

The wheel means 14 is mounted on the frame just rearwardly of the nose wheel means 12, and this comprises a pair of ground-engaging wheels, designated 40, which are mounted upon a frame structure 41 carried upon a stem 42 which forms a part of a ram or piston cylinder assembly, the cylinder of which, designated 43, is carried upon the frame 11. The wheels 40 may have a hydraulic or other type of braking system (not shown) and preferably each of the wheels is driven by a motor 45 through suitable gear reduction means and such clutch means as may be desired, designated 46, chain 47 being shown connecting the two. The motor is preferably electric.

The wheel means 14 is adapted to be steered, and for this purpose the wheel frame structure 41 is provided with a gear segment designated 48, which meshes with a pinion 49 of gear reduction means 50 (Fig. 3). The latter is driven by a motor 51. The entire assembly 50 and 51 is mounted on a frame 52 for movement in a vertical guide track means 53 so that it moves vertically with the wheel means 14 during the elevating and lowering thereof.

The rear end of the frame is supported upon two wheels of the wheel means 16. Each of these comprises a wheel 55 journaled in a wheel-supporting structure 56 having a cylindrical stem 57 received in a cylindrical recess 58 in the frame. Each of the wheels 55 is driven by an individual motor 60 through suitable gear reduction and drive means 61. For the purpose of steering the rear wheels, each of the wheel-carrying structures 55 is fitted with a gear segment 64 which meshes with a drive pinion 66. The latter is driven by motor 68 (Fig. 4) through suitable gear reduction means 69 to pivot the wheels 55 as a unit.

The rear of the frame may support a suitable type of internal combustion engine, designated 70, which can drive a main generator 71, a secondary generator 72 for the electrical accessories, and a hydraulic pump 73. It is to be understood, of course, that generator 71 is connected through a control means (not shown) for supplying electrical energy to the motors for driving the wheels. Similarly, the other generator, 72, is connected through suitable control means (not shown) for driving the accessory motors, such as those used for power steering, and a motor 75 which is operatively connected to a main winch 76 carried on a subframe 77 depending from the main frame 11. A secondary winch 78 is provided at the front end of the vehicle upon the frame and it has a motor 79 which may be operated by current supplied by generator 72. It will be understood that suitable fluid lines, connections, and controls are provided for operating the various fluid-operated devices heretofore and later to be described, although such are not shown.

Intermediate its ends the frame is provided with the pipe-supporting means 18 (see Figs. 1, 2, and 6) which comprises a pair of spaced hydraulic jacks 80. Each jack carries a cross beam 81 upon which is mounted a pair of longitudinally extending pipe-engaging means, designated 84. The beams extend somewhat beyond the two jacks and at the rear end are provided with plates 85 which extend laterally of the respective beams, as best shown in Fig. 6, to provide an abutment for the end of the pipe.

Figure 6:
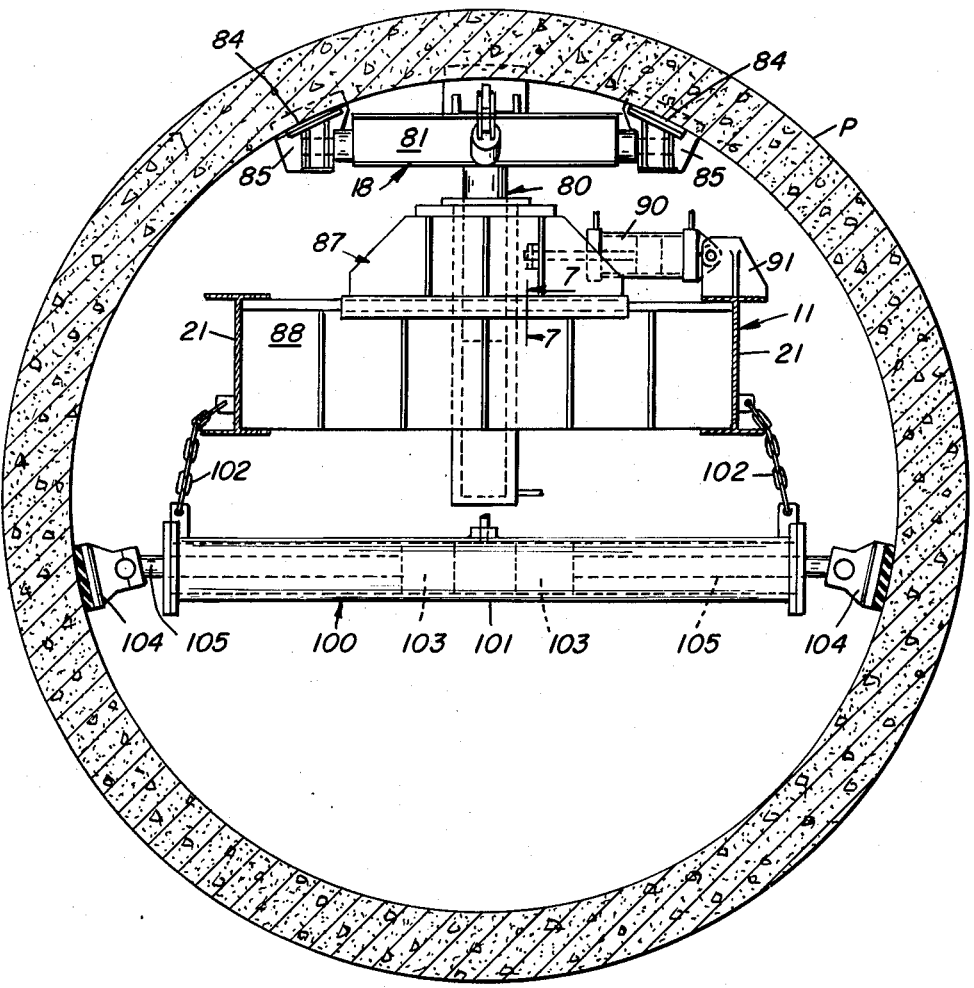
Fig. 6 is a sectional view on line 6—6 of each of Figs. 1 and 2.
Figure 7:
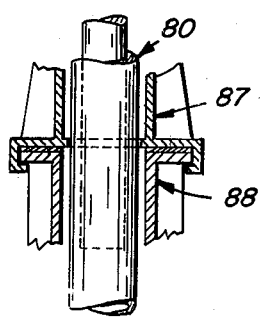
Fig. 7 is a fragmentary sectional view on line 7—7 of Fig. 6.

Each jack 80 includes a base 87 which is mounted slidably upon track members 88 extending between the side rails 21 of the frame, as best shown in Figs. 6 and 7. Each base 87 is adjusted by means of a fluid ram 90 connected between each base and a stationary bracket 91.

Mounted upon the forward cross beam 81 is an abutment means for engaging the front end of the pipe. This means includes a flanged shoe 94 connected by a pin and slot 94' to the central one of three links 95 pivoted upon the forward cross beam 81. The center link carries a pivotally mounted two-piece lever 96, one end of which bears against the interior of the shoe and the other end of which is pivotally connected to a fluid ram 97. The operation of the ram is such as to draw the shoe in against the end of the pipe and at the same time force it against the interior of the pipe.

In transporting pipe it is desirable to stress the same in a direction or plane substantially normal to the plane or direction of the lifting force. We therefore provide a pair of pipe-stressing units 100. The pipe-stressing units (see Figs. 2 and 6) comprise a main cylinder 101 suspended from the frame of the vehicle by chains 102 at each end. Within the cylinder 101 is a pair of pistons 103 which carry pivotally mounted pads 104 upon piston rods 105. It will be apparent that by application of fluid pressure centrally of the cylinder 101 the pipe-engaging pads 104 are forced outwardly into pressure engagement with the pipe.

It will be understood that, although they have not been shown, suitable fluid conduits and controls would be provided for the various fluid-operated parts of the vehicle and that, similarly, electric wiring and controls would be provided for the electrical units.

In the operation of the device to pick up and transport a section of pipe, nose wheel means 12 is first raised and the vehicle advanced so that the nose wheel 30 enters the pipe. While the nose wheel is carrying the weight of the forward end of the machine, wheels 40 are raised so that they can run inside the pipe. The machine is then advanced through the pipe until the nose wheel 30 protrudes and can be lowered to the ground. Subsequently the wheels 40 are lowered after the machine has been advanced on the nose wheel to the position of Fig. 1. The pipe section is then elevated by raising means 18, and centered, if required, by adjustment of rams 80 by adjustment rams 88. The pipe-stressing units 100 are then expanded into tight engagement with the pipe and shoe 94 adjusted against the front end of the pipe. The vehicle can then be advanced and the nose wheel lowered against the previously laid pipe section inner surface to bear the load, and wheels 40 raised. The vehicle is again advanced to bring the pipe approximately into place, after which the pipe section is lowered to where it is approximately in place. A line from the main winch 76 may then be anchored at a point some distance down the pipeline being laid and the winch used to pull the pipe tightly into place. The smaller forward winch, which may be of a high speed type, can be used to draw out the line from the main winch. The vehicle is then released from the pipe by disengaging the units 100 and means 18 and releasing the winch line, after which the vehicle can be backed out of the pipe section, wheels 40 being lowered to the ground after clearing the end of the pipe and before nose wheel 30 leaves the pipe. The winches may also be used to assist movement of the vehicle on grades and over difficult terrain.

Although we have illustrated and described a preferred form of our invention, we contemplate that various changes and modifications can be made therein without departing from the invention, the scope of which is indicated by the following claims.

We claim:

1. A vehicle for lifting, transporting and placing large, heavy pipe sections or the like, comprising an elongated frame extending generally longitudinally of the vehicle of substantially greater length than a pipe section, pipe support means on the frame spaced inwardly from the ends thereof and projecting above the frame for supporting a pipe section in encircling relation to the frame with the pipe section spaced inwardly of the ends of the frame, a ground-engaging first wheel means at one end portion of the frame beyond said pipe support means, a ground-engaging second wheel means at said same one end portion of the frame between said pipe support means and said first wheel means, a ground-engaging third wheel means mounted on the frame at the other end portion thereof beyond said pipe support means, independent means mounting said first and said second wheel means to enable the same to be adjustably raised and lowered relative to the frame, said first and second wheel means being raisable sufficiently to permit said vehicle to enter and said one end portion thereof to pass through a pipe section to be lifted and transported to position said first and second ground-engaging wheel means beyond the far end of the entered pipe section, and means for independently raising and lowering said first and second wheel means relative to the frame.

2. The vehicle set forth in claim 1 in which motive power means is carried by said frame and operably connected to said third wheel means for driving the same.

3. A self-propelled vehicle as set forth in claim 1 in which said second and third wheel means are each pivotal about a vertical axis and in which means is provided for steering said wheel means independently of each other.

4. The vehicle as set forth in claim 1 in which said first wheel means embodies a single wheel mounted in a vertical plane coincident with the longitudinal axis of the frame, in which said second wheel means embodies a pair of relatively closely laterally spaced wheels, and in which said third wheel means embodies a pair of relatively widely laterally spaced wheels.

5. The vehicle set forth in claim 1 in which said pipe support means comprises a pair of power-operated jacks mounted on said frame and spaced longitudinally thereof, and a pair of laterally spaced beams carried by said jacks and extending longitudinally of the frame upon which the pipe rests.

6. The vehicle set forth in claim 1 in which said pipe support means includes a pair of power-operated jacks mounted on said frame in spaced relation longitudinally thereof, said jacks being mounted for movement laterally of the frame, and power means for shifting said jacks laterally of the frame.

7. The vehicle set forth in claim 1 in which said pipe support means includes vertically raisable means extending above the frame and expansible means extending laterally of the frame.

References Cited in the file of this patent

UNITED STATES PATENTS

| | | |
|---|---|---|
| 1,195,147 | Mitchell | Aug. 15, 1916 |
| 1,571,372 | Dalzell | Feb. 2, 1926 |
| 2,020,520 | Sarosdy | Nov. 12, 1935 |
| 2,486,801 | Sarosdy | Nov. 1, 1949 |
| 2,820,557 | Emanuel | Jan. 21, 1958 |